United States Patent
Stark et al.

(10) Patent No.: US 8,412,413 B1
(45) Date of Patent: Apr. 2, 2013

(54) VEHICLE WINDSHIELD DISPLAY WITH OBSTRUCTION DETECTION

(75) Inventors: Kris R. Stark, Carmel, IN (US); Dwadasi H. R. Sarma, Kokomo, IN (US); Frederick F. Kuhlman, Kokomo, IN (US); Mark R. Vincen, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/332,725

(22) Filed: Dec. 21, 2011

(51) Int. Cl.
*G06F 7/00* (2006.01)
*G06F 17/00* (2006.01)
*G09G 5/00* (2006.01)
*G02F 1/1335* (2006.01)
*G01C 21/00* (2006.01)
*G03H 1/00* (2006.01)

(52) U.S. Cl. .......... 701/36; 701/45; 701/49; 345/7; 349/11; 340/980; 359/13; 359/630

(58) Field of Classification Search ........... 701/1, 36, 701/45, 49, 33.2, 519, 523, 438; 359/13, 359/15, 618, 630, 838, 839, 488.01; 345/7, 345/8; 340/461, 980, 438, 457, 12.18, 815.55, 340/905, 435; 353/13, 14; 40/591; 349/11, 349/96; 156/99; 428/31; 374/E1.018, 208; D12/198; 348/148; 382/104
See application file for complete search history.

(56) References Cited

U.S. PATENT DOCUMENTS

| | | | | |
|---|---|---|---|---|
| 5,506,595 A * | 4/1996 | Fukano et al. | | 345/7 |
| 6,559,813 B1 * | 5/2003 | DeLuca et al. | | 345/8 |
| 6,720,938 B2 * | 4/2004 | Ohkawara et al. | | 345/7 |
| 6,731,436 B2 * | 5/2004 | Ishii et al. | | 359/630 |
| 7,167,779 B2 * | 1/2007 | Kashiwada et al. | | 345/7 |
| 7,561,966 B2 * | 7/2009 | Nakamura et al. | | 701/438 |
| 7,629,946 B2 * | 12/2009 | Nagata | | 345/7 |
| 7,764,247 B2 * | 7/2010 | Blanco et al. | | 345/7 |
| 7,920,102 B2 * | 4/2011 | Breed | | 345/7 |
| 7,952,808 B2 * | 5/2011 | Hotta et al. | | 345/7 |
| 2009/0073081 A1 * | 3/2009 | Kakizaki | | 345/7 |

* cited by examiner

*Primary Examiner* — Thomas Black
*Assistant Examiner* — Dale W Hilgendorf
(74) *Attorney, Agent, or Firm* — Lawrence D. Hazelton

(57) ABSTRACT

A vehicle windshield display system for detecting obstruction of a vehicle operator's field of view by a windshield display. The system provides closed-loop feedback to perform a visual check of what is actually being displayed on a windshield display in order to avoid obstructing an operator's field of view. The system includes a windshield display configured to be installed into a vehicle and configured to display a graphic in a field of view of an operator of the vehicle, a camera configured to determine an image of the graphic displayed by the windshield display, and a controller configured to determine if the image indicates that field of view is obstructed. The camera is used to monitor the windshield display and provide feedback to the controller so that appropriate adjustments to the graphic being displayed can be made.

7 Claims, 3 Drawing Sheets

VEHICLE WINDSHIELD DISPLAY WITH OBSTRUCTION DETECTION

TECHNICAL FIELD OF INVENTION

This disclosure generally relates to vehicle windshield display systems, and more particularly relates to detecting obstruction of a vehicle operator's field of view through a windshield display based on a camera image of the windshield display.

BACKGROUND OF INVENTION

Windshield displays that use the entire windshield as a display are being developed for vehicles such as automobiles. Several technologies are suitable to provide windshield displays including, but not limited to: electrowetting cells, organic light emitting diode (OLED), liquid crystal device (LCD), and projection type displays using lasers or other light projection devices. Government regulations generally specify a degree of transparency for vehicle windshields. However, regulations pertaining to windshield displays have yet to be developed. What is needed is a way to determine that a vehicle operator's field of view to an area in front of or around the vehicle is not being obstructed by a windshield displays installed in the vehicle.

SUMMARY OF THE INVENTION

In accordance with one embodiment, a vehicle windshield display system for detecting obstruction of a vehicle operator's field of view by a windshield display is provided. The system includes a windshield display, a camera, and a controller. The windshield display is configured to be installed into a vehicle and is configured to display a graphic in a field of view of an operator of the vehicle. The camera is configured to determine an image of the graphic displayed by the windshield display. The controller is configured to determine if the image indicates that field of view is obstructed.

In another embodiment, a controller for a vehicle windshield display system for detecting obstruction of a vehicle operator's field of view by a windshield display is provided. The controller includes an output, an input, and a processor. The output is configured to operate a windshield display installed into a vehicle to display a graphic in a field of view of a vehicle operator. The input is configured to receive an image signal from a camera indicative of an image of the graphic displayed by the windshield display. The processor is configured to determine if the image indicates that field of view is obstructed.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
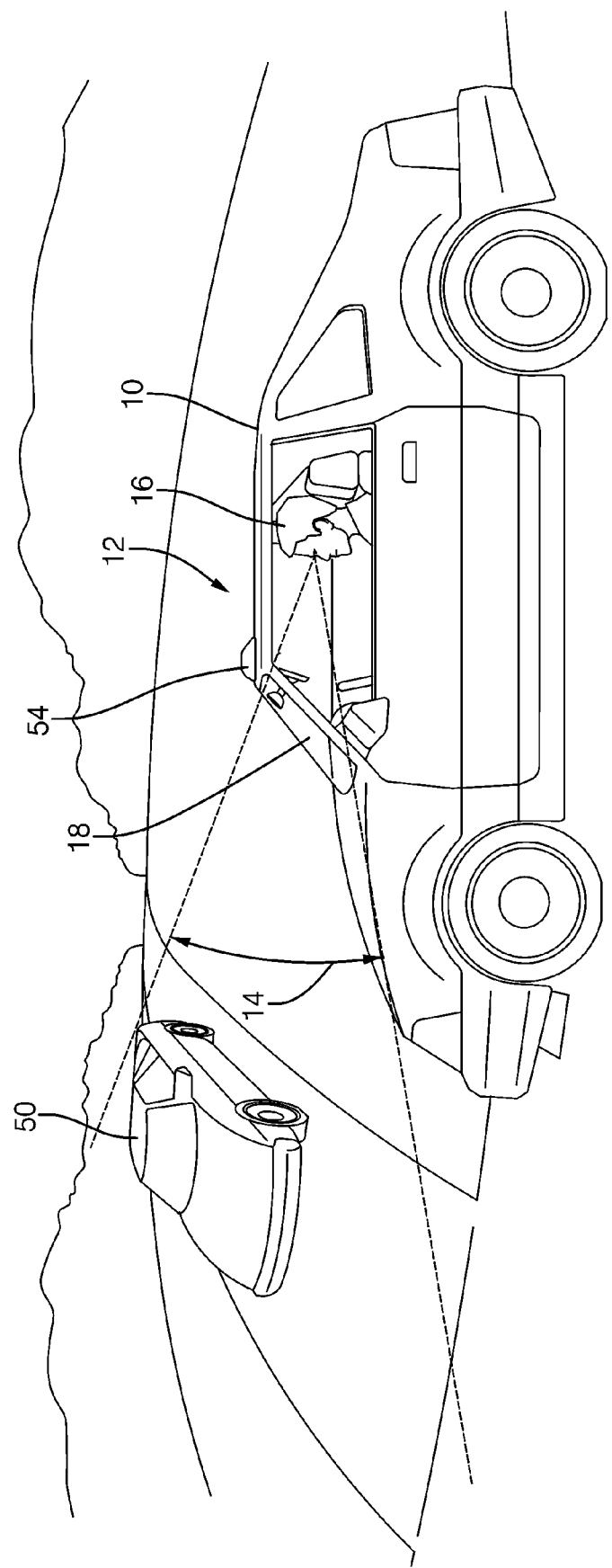
FIG. 1 is a perspective view of a vehicle equipped with a windshield display system in accordance with one embodiment.

FIG. 1 illustrates a non-limiting example of a vehicle 10, equipped with a vehicle windshield display system 12. In general, the system 12 is configured to detect or determine if a field of view 14 of an operator 16 residing in the vehicle 10 is being obstructed by a windshield display 18. As used herein, the field of view 14 may be deemed obstructed if what is being displayed on the windshield display 18 negatively interferes with the operator 16 driving the vehicle 10. This does not imply that anything displayed on the windshield display 18 is an obstruction as in some instances it is advantageous to display something directly in the line of sight of the operator 16 so the operator does not need to avert his or her eye gaze direction from the roadway ahead to be able to see what is being displayed. As will be described in more detail below by way of examples, if it is determined that the field of view 14 of the operator 16 is being obstructed by the windshield display 18, the system 12 may respond by taking some action to minimize or eliminate the obstruction.

The windshield display 18 may be based on any technology suitable for providing a transparent type display that can be attached to, installed with, or otherwise integrated into a vehicle windshield. Flexible transparent displays based on organic light emitting diode (OLED) and liquid crystal device (LCD) display technologies are available from a variety of manufacturers such as Samsung, Sony, and NEC would be suitable to apply to a windshield. Suitable display types include emissive (OLED), transmissive (LCD), transparent/opaque or fluorescence (electrowetting), or projection type display projecting light onto the windshield with or without the benefit of a film or other surface treatment. The examples described herein are generally directed to the forward view windshield of a vehicle, but it is recognized that the system 12 could also be used on a side view or rear view window of a vehicle.

Figure 2:
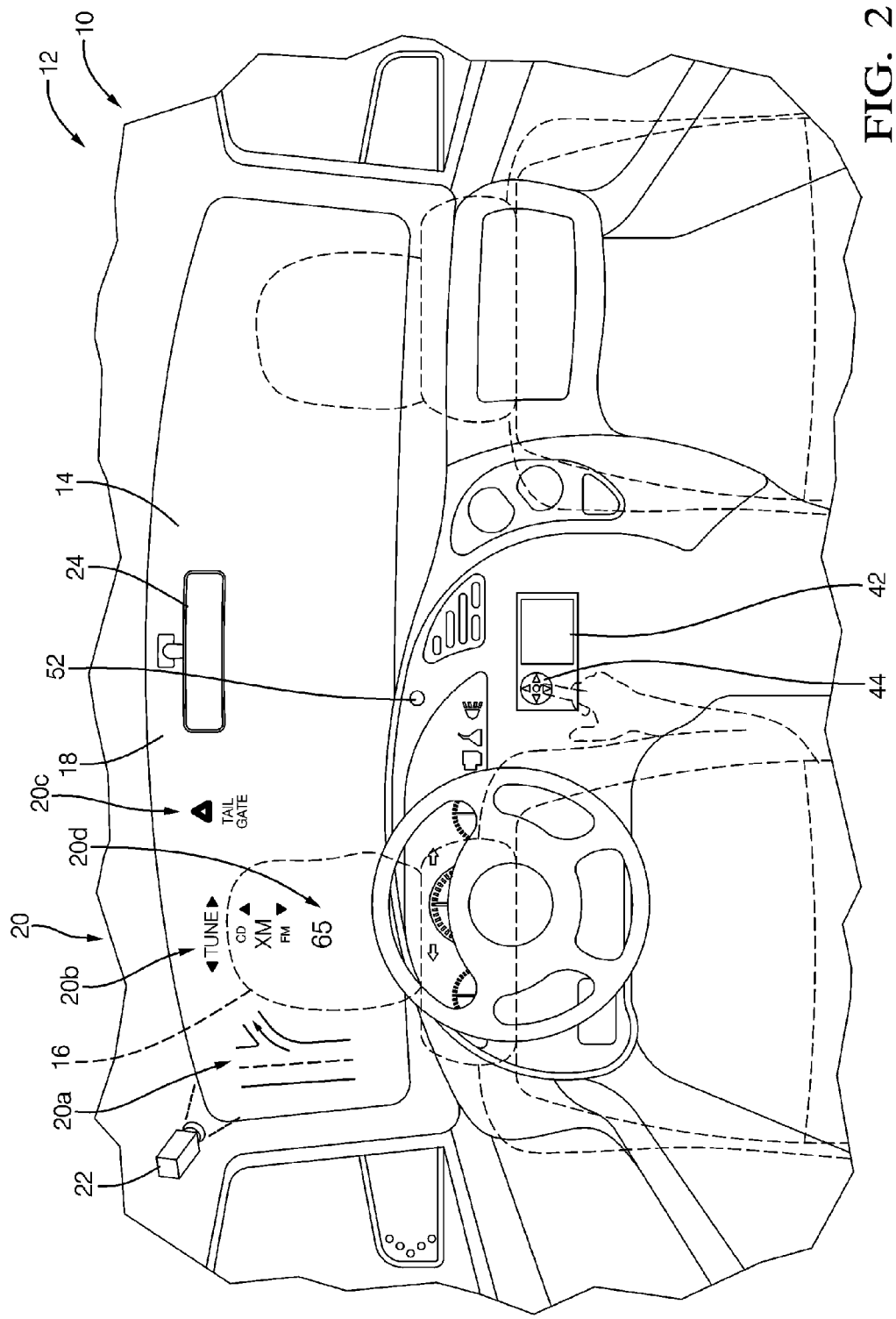
FIG. 2 is a cut-away view of a vehicle interior equipped with the windshield display system of FIG. 1 in accordance with one embodiment.

FIG. 2 illustrates a non-limiting example of a graphic 20 being displayed on the windshield display 18 the field of view 14, i.e.—along a line of site through the windshield display 18. As used herein a graphic is any character, symbol, illustration, or other feature displayed by the windshield display 18 such as the navigation information 20a as illustrated on the windshield display 18 to the left of the operator 16, the entertainment system information 20b and vehicle speed 20d as illustrated directly in front of the operator 16, or the tail-gate warning symbol 20c indicating that another vehicle is tailgating the vehicle 10 as illustrated to the right of the operator 16.

Figure 3:
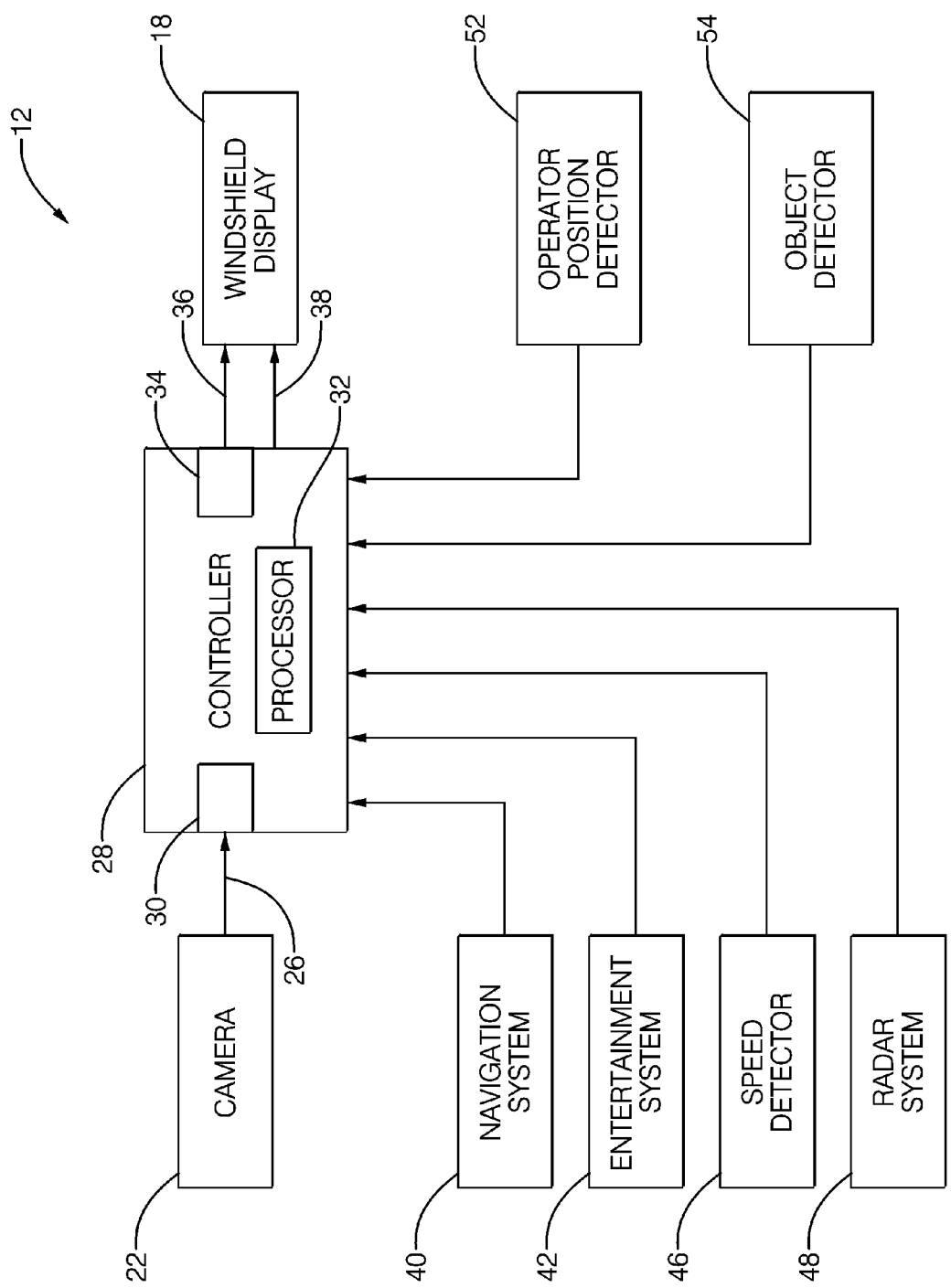
FIG. 3 is a block diagram of the system of FIG. 1 in accordance with one embodiment.

FIG. 3 illustrates a non-limiting example of a schematic diagram of the system 12. The system 12 may include a camera 22 configured to determine an image of the graphic 20 displayed by the windshield display 18. The camera 22 may be located anywhere that allows the camera to view the windshield display 18, for example located as shown in FIG. 2, or other locations such as on the back side (not shown) of a rear view minor 24. The camera 22 may also be located to also view the field of view 14 outside the vehicle 10, the advantage of which will become apparent in the description below. The image of the graphic 20 may be included in or communicated by an image signal 26 output by the camera 22. It is contemplated that the system 12 may include multiple cameras located at various locations, and that image signals from these various cameras can be combined or separately analyzed to determine what is being displayed on the windshield display 18, and what is present in the scene surrounding the vehicle 10.

The system may also include a controller 28 that includes an input 30 configured to receive the image signal 26 from the camera 22, where the image signal 26 may include an indication of an image of the graphic 20 displayed by the windshield display 18. The controller 28 may also include processor 32 configured to determine if the image indicates that field of view is obstructed. The controller 28 or the processor 32 may include a microprocessor (not shown) or other control circuitry as should be evident to those in the art. The controller 28 or the processor 32 may also include memory, including non-volatile memory, such as electrically erasable programmable read-only memory (EEPROM) for storing one or more routines, thresholds and captured data. The one or more routines may be executed by the controller 28 or the processor 32 to perform steps for determining if the image signal 26 received indicates that the field of view 14 is obstructed as described herein. The controller 28 may also include an output 34 configured to operate the windshield display 18 by way of a graphic signal 36. Operating the windshield display 18 generally includes indicating what graphics are to be displayed at any given time.

A number of scenarios or situations that may lead to the windshield display 18 inadvertently obstructing the operator's field of view will now be described. These examples are not limitations of the system 12, but serve as examples of how the camera 22 allows the controller 28 to detect if obstruction is occurring. The determination that obstruction is occurring may be based on a bitmap check or pixel wise comparison of what is expected to be displayed based on the graphic signal 36 and what is actually being displayed base on the image signal 26, current check, and visual check using a camera. Also described below are instances of how sensor fusion (combining of several inputs) can be used to increase the reliability of the system with regard to making the determination that obstruction is occurring. Alternatively, the determination that obstruction is occurring may be based on a comparison of what is actually being displayed based on the image signal 26 to relevant government regulations.

It may occur that the windshield display 18, or the controller 28, or the means used to communicate the graphic signal 36 are inadvertently damaged, which may cause the windshield display 18 to be activated in such a way as to obstruct the field of view 14. For example, if all of the pixels in the windshield display located in front of the operator 16 were activated, the controller 28 may not be able to detect this problem if not for the image signal 26 from the camera 22. If the controller 28 determines that the image signal 26 indicates that the windshield display 18 is obstructing the field of view 14 because of such an undetectable problem, the controller 28 may be configured to disable the windshield display 18 by, for example, interrupting a power supply signal 38 for the windshield display 18.

It may occur that that simultaneous events lead to an amount of information being displayed that could be characterized as obstructing the field of view 14. For example, as illustrated in FIGS. 2 and 3, a navigation system 40 may provide the navigation information 20a in response to an upcoming turn, an entertainment system 42 may provide the entertainment system information 20b in response to the operator 16 actuating a control input 44, a speed detector 46 may provide the vehicle speed 20d of the vehicle 10, and a radar system 48 may provide an indication that a trailing vehicle (not shown) is tail-gating by having the tail-gate warning symbol 20c displayed. In response, the controller 28 may be further configured to redistribute the graphic 20 by, for example, moving the vehicle speed 20d to the left, and moving the entertainment system information 20b down and to the right. As used herein, redistributing the graphics displayed includes, but is not limited to, moving the display location of one or more of the graphics (20a, 20b, 20c, 20d), changing (reducing) the display intensity of the graphics, changing the format of the graphics by changing the size of the graphics, or changing the general format of the graphic such as showing only a tab along the bottom of the windshield display 18 indicating that information is available, but not displaying any specific information.

The camera 22, or additional cameras (not shown) may be located so that the one or more cameras are able to determine or capture an image of the field of view 14. Accordingly, the controller may be further configured to determine if the image of the field of view 14 indicates an object in the field of view, for example an approaching car 50. FIG. 1 illustrates the approaching car 50 as approaching from an elevated location to the right of the vehicle 10, and so the tail-gate warning symbol 20c may obstruct the operator's view of the approaching car 50. In response, the controller 28 may redistribute the graphic 20 by, for example, moving the tail-gate warning symbol 20c downward on the windshield display 18, or by reducing the intensity that the tail-gate warning symbol 20c is displayed so the operator can see through the tail-gate warning symbol 20c and detect the approaching car 50.

The system 12 may include an operator position detector 52 located, for example, in the dash so that the location of the operator's head or eyes can be determined. The controller 28 may then be further configured to determine if the field of view 14 is obstructed based on an operator position. For example, if the operator is tall, or is leaning to one side, the locations of the graphics that result in obstruction, or the redistributed location of the graphics for addressing an obstruction event may change because the operator's eyes are in a different location than what is typically expected. The operator position detector 52 may be a vision based system that is well known in the art for determining the location and gaze direction of a vehicle operator.

The system 12 may include an object detector 54 configured to detect objects in the field of view 14, for example the approaching car 50. The object detector 54 may be radar or vision based, and such devices are well known in the art. Accordingly, the controller 28 may be further configured to redistribute the graphic 20 if a view of the object (e.g. approaching car 50) is obstructed. Like the operator position detector 52, the controller 28 can use this information to better determine if the operator's view of a particular object is obstructed by the graphic 20 on the windshield display 18.

Accordingly, a vehicle windshield display system 12, is provided. The system 12 may be characterized as a closed-loop feedback system that performs a visual check of what is actually being displayed on the windshield display 18. A camera 22 is used to monitor the windshield display 18 and provide feedback to the controller 28 so that appropriate adjustments to the graphic 20 can be made. Feedback may also provided to the controller to turn-off or disable the windshield display in the event of damage to some part of the system, thereby restoring the view for the operator 16. The closed-loop feedback aspect of the system 12 can also be used to redistribute information on the windshield display 18 so that it does not occupy too much of the operator's field of view 14. If there is too much information to accommodate by just moving portions or aspects of the graphic 20, the graphic 20 can be redistributed by minimizing portions into icons outside the field of view 14, and then re-maximized at another time.

While this invention has been described in terms of the preferred embodiments thereof, it is not intended to be so limited, but rather only to the extent set forth in the claims that follow.

We claim:

1. A vehicle windshield display system for detecting obstruction of a field of view of an operator to an area forward of a vehicle by a graphic displayed by a windshield display, said system comprising:
    the windshield display configured to be installed into the vehicle and configured to display the graphic on a windshield such that the graphic is located in the field of view of the operator of the vehicle, wherein the operator can see through the windshield display to the area forward of the vehicle when no graphic is being displayed;
    a camera configured to determine an image of the graphic being displayed on the windshield by the windshield display; and
    a controller configured to determine if the image indicates that the graphic being displayed in the field of view is obstructing the field of view of the operator to the area forward of the vehicle, and adjust the graphic displayed by the windshield display in a manner effective to reduce the obstruction of the field of view by the graphic.

2. The system in accordance with claim 1, wherein the controller is further configured to disable the windshield display if the field of view is obstructed la the graphic.

3. The system in accordance with claim 1, wherein the controller is further configured to redistribute the graphic if the field of view is obstructed by the graphic.

4. The system in accordance with claim 1, wherein the camera is further configured to determine an image of the field of view, the controller is further configured to determine if the image indicates an object in the field of view, and redistribute the graphic if a view of the object is obstructed by the graphic.

5. The system in accordance with claim 1, wherein the system further comprises an operator position detector, and the controller is further configured to determine if the field of view is obstructed by the graphic based on an operator position.

6. The system in accordance with claim 1, wherein the system further comprises an object detector configured to detect objects in the field of view, and the controller is further configured to redistribute the graphic if a view of the object is obstructed by the graphic.

7. A controller for a vehicle windshield display system for detecting obstruction of a field of view of an operator to an area forward of a vehicle by a graphic displayed by a windshield display, wherein the operator can see through the windshield display to the area forward of the vehicle when no graphic is being displayed, said controller comprising:
    an output configured to operate the windshield display installed into the vehicle to display the graphic on a windshield that is in the field of view of the operator;
    an input configured to receive an image signal from a camera indicative of an image of the graphic being displayed on the windshield by the windshield display; and
    a processor configured to determine if the image indicates that the graphic being displayed in the field of view is obstructing the field of view of the operator to the area forward of the vehicle, and adjust the graphic displayed by the windshield display in a manner effective to reduce the obstruction of the field of view by the graphic.

* * * * *